(12) United States Patent
Kato

(10) Patent No.: US 7,207,528 B2
(45) Date of Patent: Apr. 24, 2007

(54) VIBRATION SUPPRESSING CLAMP FOR PIPE OR THE LIKE

(75) Inventor: Hiroyuki Kato, Ninomiya-machi (JP)

(73) Assignee: Newfrey LLC, Newark, DE (US)

( * ) Notice: Subject to any disclaimer, the term of this patent is extended or adjusted under 35 U.S.C. 154(b) by 203 days.

(21) Appl. No.: 10/929,488

(22) Filed: Aug. 31, 2004

(65) Prior Publication Data

US 2005/0045775 A1  Mar. 3, 2005

(30) Foreign Application Priority Data

Sep. 2, 2003 (JP) .............................. 2003-309839

(51) Int. Cl.
*F16L 3/16* (2006.01)
(52) U.S. Cl. .................. 248/55; 248/68.1; 248/73; 248/74.1
(58) Field of Classification Search ............ 248/68.1, 248/73, 74.1, 74.2, 55, 71
See application file for complete search history.

(56) References Cited

U.S. PATENT DOCUMENTS 5,954,300 A  9/1999 Sturies et al. ............... 248/68.1

7,011,277 B2 *  3/2006 Mizukoshi et al. ......... 248/68.1

FOREIGN PATENT DOCUMENTS

| DE | 296 20 300 | 3/1997 |
| EP | 0 964 195 | 12/1999 |
| EP | 1 013 978 | 6/2000 |
| EP | 1450090 | 8/2004 |
| EP | 1 469 249 | 10/2004 |
| JP | 4-44581 | 4/1992 |
| JP | 9-184580 | 7/1997 |
| JP | 11-304055 | 11/1999 |
| WO | 02/079682 | 10/2002 |

\* cited by examiner

*Primary Examiner*—Amy J. Sterling
(74) *Attorney, Agent, or Firm*—Miles & Stockbridge P.C.

(57) ABSTRACT

A vibration suppressing clamp for pipe or the like comprises a base supporting a pipe holder with a space for accommodating a pipe to be held. The space is defined by a curved seat and a pair of walls extending from the seat. At least one of the walls is flexible, has a piece at a tip portion for holding a pipe in the space, and is spaced from an adjacent rigid wall. A vibration suppression member covers the seat and adjacent portions of each flexible wall and fills at least a portion of the space between the flexible wall and the adjacent rigid wall. The seat and the base have holes into which deformed portions of the vibration suppression member can retract in response to an impact on a pipe in the pipe holder.

10 Claims, 4 Drawing Sheets

VIBRATION SUPPRESSING CLAMP FOR PIPE OR THE LIKE

CROSS-REFERENCE TO RELATED APPLICATION

This application claims the benefit of Japanese Patent Application No. 2003-309839 filed Sep. 2, 2003, incorporated herein by reference.

BACKGROUND OF THE INVENTION

The present invention relates to a clamp for holding elongated objects, such as pipes, wire harness, fuel lines, or hydraulic brake lines, to a vehicle body, for example, and more particularly to a vibration suppressing clamp constructed so that vibration is not transmitted from the object to the vehicle body, and/or so that vibration is not transmitted from the vehicle body to the object. Although the invention is applicable to a variety of elongated objects, for simplicity of description all such objects will be referred to hereinafter as an object or a pipe without limitation.

Laid-Open Utility Model Application [JIKKAI] No. H4-44581/1992, gazette (Patent Literature 1) discloses a clamp for pipes, and for preventing rattle noises that accompany vibration. The clamp comprises a base and a pipe holder supported by the base. The pipe holder comprises curved walls that form concavities for accepting pipes, and elastic holding pieces, extending diagonally from tip parts of the curved walls in the direction of the concavities, for pressing side surfaces of pipes accommodated in the curved walls. The inner wall surfaces are covered with a soft shock-absorbing resinous material that directly contacts pipes held by the curved walls so that rattle noise is absorbed.

Laid-Open Patent Application [TOKKAI] No. H9-184580/1997 (Patent Literature 2), a counterpart of U.S. Pat. No. 5,954,300 issued Sep. 21, 1999, discloses a vibration suppressing clamp for pipes designed so that vibration is not transmitted from pipes to a vehicle body, for example, and/or so that vibration is not transmitted from a vehicle body to pipes. The vibration suppressing clamp effects noise suppression by the deployment of vibration attenuating material between a pipe holder consisting of a hard resinous material and a base consisting of a hard resinous material for supporting the pipe holder.

Laid-Open Patent Application [TOKKAI] No. H11-304055/1999, gazette (Patent Literature 3) discloses a vibration suppressing clamp for pipes, designed so that vibration is not transmitted from pipes to a vehicle body, for example, and/or so that vibration is not transmitted from a vehicle body to pipes. The vibration suppressing clamp is intended to suppress rattle noises accompanying vibration, and effects noise suppression by the deployment of a vibration suppression member between a pipe holder consisting of a hard resinous material and a base consisting of a hard resinous material for supporting the pipe holder.

The clamp described in Patent Literature 1 directly holds pipes with a soft shock-absorbing (vibration suppressing) resinous material, so the vibration suppression effect can be enhanced, but in order to raise the vibration suppression effect, it is necessary to make the vibration suppressing resinous material thick. The vibration suppression member is soft, however, and if it is made thick, the pipe holding force will weaken, and so there is a danger that pipes will wobble inside the curved walls. There is also a danger of the vibration suppressing resinous material peeling away due to strong forces on pipes in the axial direction. Should a pipe compress the vibration suppression member due to shock, there is a danger that the vibration suppression member will be excessively deformed and fail, because there is nowhere for the material to escape.

The vibration suppressing clamp described in Patent Literature 2 and Patent Literature 3, unlike the clamp in Patent Literature 1, has no vibration suppression member between the pipe holder and pipes, and exhibits low vibration absorbing effect compared to clamps that hold pipes directly with a vibration suppression member as in Patent Literature 1.

BRIEF DESCRIPTIONS OF THE INVENTION

Accordingly, an object of the present invention is to provide an improved vibration suppressing clamp for pipes in which enhanced vibration suppression is realized while holding pipes with sufficient holding force, and in which the vibration suppression member will not be excessively deformed even if compressed by a pipe due to shock.

In one embodiment of the invention, a vibration suppressing clamp for pipes comprises a base with a pipe holder supported by the base, the pipe holder comprising a seat that forms a bottom surface for supporting a pipe, and a pair of opposite walls rising from side edges of the seat for forming a space that accommodates the pipe in cooperation with the seat. Specifically, at least one of the walls may be capable of flexing relative to the pipe accommodating space and relative to a space between the flexible wall and an adjacent rigid wall, and may have a tip with a holding piece that presses a side surface of a pipe in the pipe holder. The seat and lower portion of the flexible wall are covered by a vibration suppression member the vibration suppression member enters in the space between the flexible wall of the adjacent rigid wall. The seat has a hole or holes that extend through the base so that portions of the vibration suppression member deformed by impact on a pipe in the pipe holder can retract into the holes.

BRIEF DESCRIPTION OF THE DRAWINGS

The invention will be further described in conjunction with the accompanying drawings which illustrate a preferred (best mode) embodiment, and wherein.

DETAILED DESCRIPTION OF THE INVENTION

Figure 1:
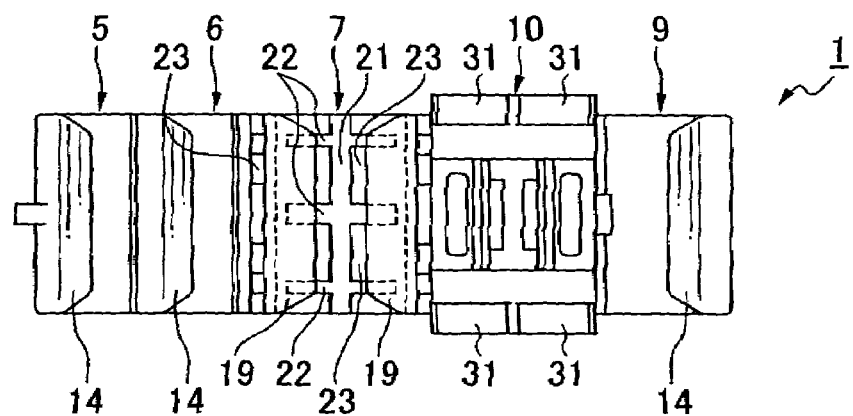
FIG. 1 is a plan view of a clamp relating to a first embodiment of the present invention before covering with a vibration suppression member.

A vibration suppressing clamp for elongated objects relating to one embodiment of the present invention will now be described with reference to the drawings.

A clamp 1 (constituting a primary molding) comprises a base 3, and pipe holders 5, 6, 7, and 9 supported by the base. The base 3 comprises a securing unit 10 for securing the base to a stud, for example, attached to a vehicle body or the like. In the example shown, the securing unit 10 is deployed between a conventional pipe holder 9 and a pipe holder 7 relating to the present invention. The base 3, pipe holders 5 to 9, and securing unit 10 are preferably molded integrally of a hard resinous material exhibiting high rigidity. The securing unit 10 may be something other than a stud securing unit, and may cooperate with an anchor clip which is inserted into and engages with an attachment hole, for example. Conventional pipe holders 5, 6, and 9 and the pipe holder 7 relating to the present invention may be formed to accommodate a variety of elongated objects. The number, size, and shape of the pipe holders can be selected discretionally to conform to the objects being held.

Each of the conventional pipe holders 5, 6, and 9 comprises a curved wall 13 for forming a space 11 to accommodate an elongated object such as a pipe, and an elastic holding piece 14, which extends diagonally from the tip of the curved wall 13 (upper end thereof in FIG. 2) toward the object accommodating space 11, for pressing down a side surface of the object. Of the pipe holders 5 to 9, all except the pipe holder 7 may be conventional pipe holders comprising a curved wall 13 and an elastic holding piece 14. A pipe is pushed down toward the elastic holding piece 14 and into the space 11, and the side surface of the pipe is pressed against by the tip of the elastic holding piece 14, so that the pipe is held in the space 11. Such pipe holders 5, 6, and 9 are well known, and no further description thereof is given here.

The pipe holder 7 is a pipe holder relating to the present invention. The pipe holder 7 comprises a seat 15 integral with the base 3 and forming a bottom surface for supporting an elongated object, and a pair of walls 18, which rise from two side edges of the seat 15 to form a space 17 for accommodating an object in cooperation with the seat. At least one of the walls 18 is a thin flexible wall that can flex relative to the space 17. In the embodiment shown, both of the walls 18 are flexible walls, but only one may be a flexible wall.

At a tip portion of each wall 18 there is an elastic holding piece 19, extending diagonally toward the space 17, for pressing down on the side surface of an elongated object accommodated in space 17. The elastic holding piece 19 may be provided on one of the walls 18 or on both walls according to the holding force necessary for the object being held. When an object such as a pipe is inserted in space 17, that insertion is made easy, because the elastic holding piece 19 can flex to the outside together with the flexible wall 18, and then return to its original position to hold the pipe securely. Furthermore, by having the elastic holding piece 19 formed on the flexible wall 18, vibration transmitted to the elastic holding piece 19 will be attenuated by the flexible wall and markedly absorbed, thus enhancing the vibration suppression effect.

Figure 3:
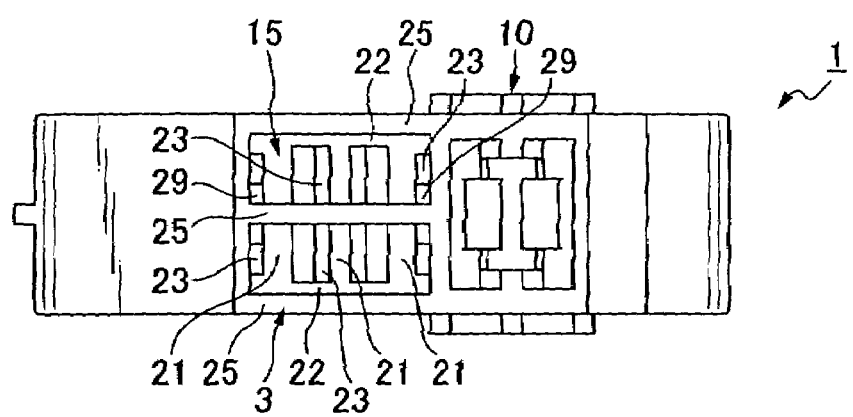
FIG. 3 is a bottom plan view of the clamp shown in FIG. 1.
Figure 4A:
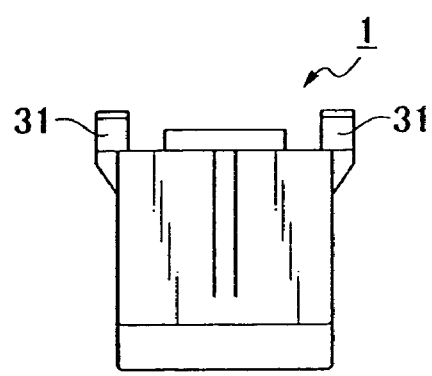
FIG. 4(A) is a left side elevation view of the clamp shown in FIG. 1.
Figure 4B:
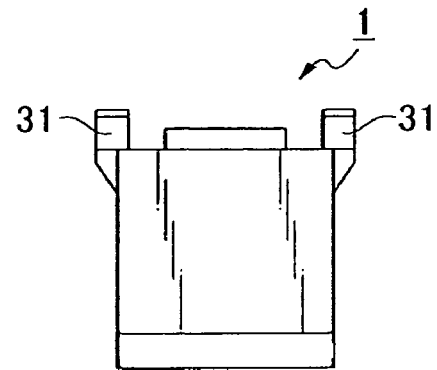
FIG. 4(B) is a right side elevation view of the clamp shown in FIG. 1.
Figure 5:
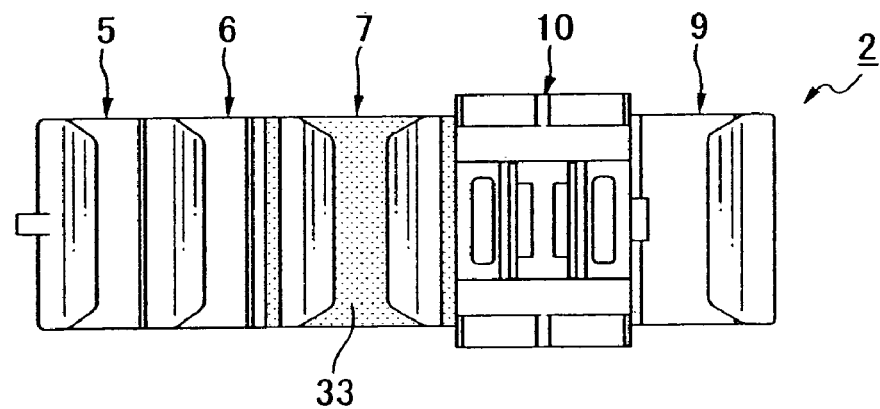
FIG. 5 is a plan view of a vibration suppressing clamp relating to an embodiment of the present invention after the clamp shown in FIG. 1 has been covered with the vibration suppression member.

Holes are formed in the seat 15 which extend through the seat 15 and the base 3. In the embodiment shown, spaces between a plurality of ribs formed in a lattice shape are formed as through-holes. In the embodiment, the seat 15 has first ribs 21 which extend in the longitudinal direction of the object and second ribs 22 which cross the first ribs 21. As shown in FIG. 1 and FIG. 3, the first ribs 21 are preferably provided as three ribs, namely one in the middle and two at side edges, and the second ribs 22, which cross the first ribs 21, are also preferably provided as three ribs, namely one in the middle and two at side edges. The portions of the base where the first ribs 21 and second ribs 22 are absent are formed as through-holes 23 which extend through the seat 15 and then pass through the base 3. The through-holes 23 form spaces for accepting deformed portions of a vibration suppression member, preferably consisting of a soft resinous material (described below), which deform due to shock or the like, that is to say, holes 23 form spaces into which deformed portions of the vibration suppression member can retract. The seat 15 has a bottom surface formed by the pluralities of first ribs 21 and second ribs 22.

Figure 2:
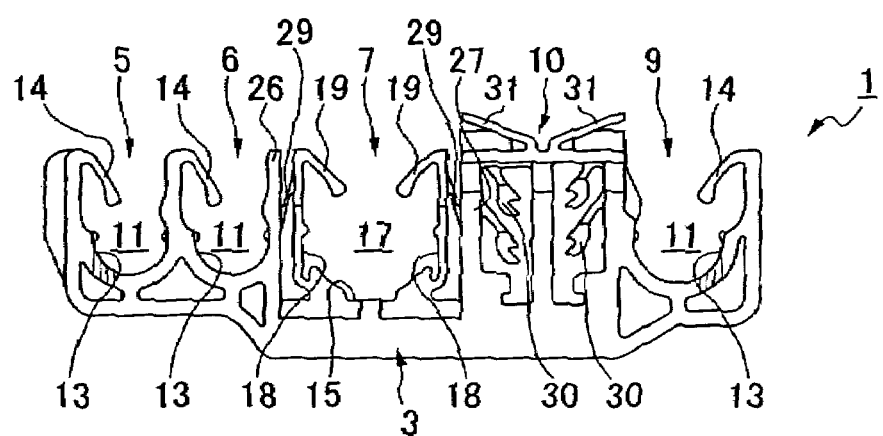
FIG. 2 is a front elevation view of the clamp shown in FIG. 1.

The bottom surface of the seat 15 is curved so as to correspond to the curved side surface of a pipe and is formed, as shown in FIG. 2, thicker toward the top, so as to make the seat 15 higher at side edges. In the portion of the base 3 that is continuous with the seat 15, the base 3 has third ribs 25 which cross the first ribs 21. In the embodiment shown, the third rib 25 in the center of the base is formed at the same position and to the same width as the center rib of the second ribs 22, and the third ribs 25 at the sides of the base 3 are formed farther to the outside than the second ribs 22 at the sides of the seat 15.

On the base 3, adjacent to the pipe holder 7, the pipe holder 6 and the securing unit 10 are integrally formed. Rigid walls 26 and 27 are formed in the pipe holder 6 and the securing unit 10, adjacent, respectively, to each of the flexible walls 18 of the pipe holder 7. There are spaces between the flexible walls 18 and the rigid walls 26 and 27, so that the flexible walls 18 can flex both toward the rigid walls 26 and 27 and toward the space 17. When a pipe is pushed into the pipe holder 7, for example, the flexible walls 18 flex toward the rigid walls 26 and 27, allowing passage of the pipe, and then return toward the space 17, so that the pipe is held with the elastic holding pieces 19 engaging the side surface of the pipe to prevent pullout.

The flexible walls 18 are coupled to the rigid walls 26 by thin coupling pieces 29, such that the vibration suppression effect of the flexible walls 18 can be maintained high, i.e., without inhibiting the attenuation or absorption of vibration by the flexible walls 18. The coupling pieces 29 also function as anchors for the vibration suppression member (described below) which enters the space between a flexible wall 18 and a rigid wall 26 or 27, reinforcing the securing of the vibration suppression member that is bonded to the pipe holder 7, and preventing peeling due to lateral shifting. The coupling pieces 29, moreover, can prevent the flexible walls 18 from excessively deflecting when a pipe is inserted into the space 17.

In the primary molding clamp 1 shown in FIGS. 1 to 4, the two side surfaces of the seat 15 and the portions of the flexible walls 18 adjacent to the seat 15 are formed shorter in the width direction than the base 3 and the rigid walls 26 and 27 and of the pipe holder 6 (that is, in the length direction of the pipe being held in the pipe holders, which is the up and down direction in FIG. 1), so as to obtain room for covering with the vibration suppression member. The upper portions of the flexible walls 18 are not covered by the vibration suppression member, so they are formed to the same width as that of the rigid wall 26 and 27 and of the pipe holder 6 and the base 3.

In the securing unit 10, in order to accept a bolt stud or circumferentially grooved stud, for example, welded to a vehicle body, for example, a plurality of stud engagement pawls 30 are formed in the stud axis direction in a stud accepting hole. As shown in FIG. 2, opposed spring pieces 31 which elastically contact the vehicle body are provided at the upper portion of the securing unit 10. These spring pieces elastically contact a vehicle body or other member being attached thereto and enhance the engagement force of the stud engagement pawls 30 into the circumferential grooves or threads of the stud.

Portions of the pipe holder 7 of the primary molding clamp 1 are covered, as shown in FIGS. 5 to 8, with a vibration suppression member 33 preferably consisting of soft resinous material, so that a vibration suppressing clamp 2 relating to the present invention is obtained as a secondary molding. In FIGS. 5 to 8, the seat 15 of the pipe holder 7 and the portions of the flexible walls 18 adjacent to the seat (i.e. the lower portions thereof) are covered by the vibration suppression member 33. This covering with the vibration suppression member 33 can be performed by so-called two-color molding or insert molding, and the number of parts and number of assembly operations can be reduced. The vibration suppression member 33 is preferably selected from soft resinous materials that will prevent shifting in the axial direction of a pipe being held. A typical material is a thermoplastic elastomer (TPE), for example. The covering, in the pipe holder 7 of the primary-molding clamp 1, can be performed using a mold which encloses the seat 15 and the lower portions of the flexible walls 18. A soft resinous material suitable for the vibration suppression member is melted, and then hardened inside the mold. The vibration suppression member 33 encloses the first ribs 21 and second ribs 22 of the seat 15, enters the through-holes between the first ribs 21 and the second ribs 22, encloses lower portions of the flexible walls 18, enters the spaces adjacent to the rigid walls 26 and 27, and forms a curved surface 34, on the upper side of the seat 15, in a shape conforming to the curvature of the side surface of a pipe, so that a pipe accepted into the object accommodating space 17 is supported by thick portions of the member 33, and high vibration suppression effect is obtained.

Figure 6A:
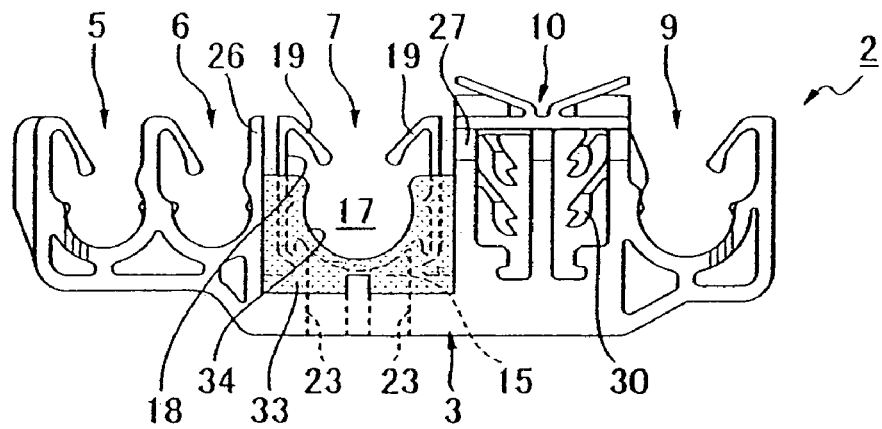
FIG. 6A is a view similar to FIG. 6, showing a modification.
Figure 6:
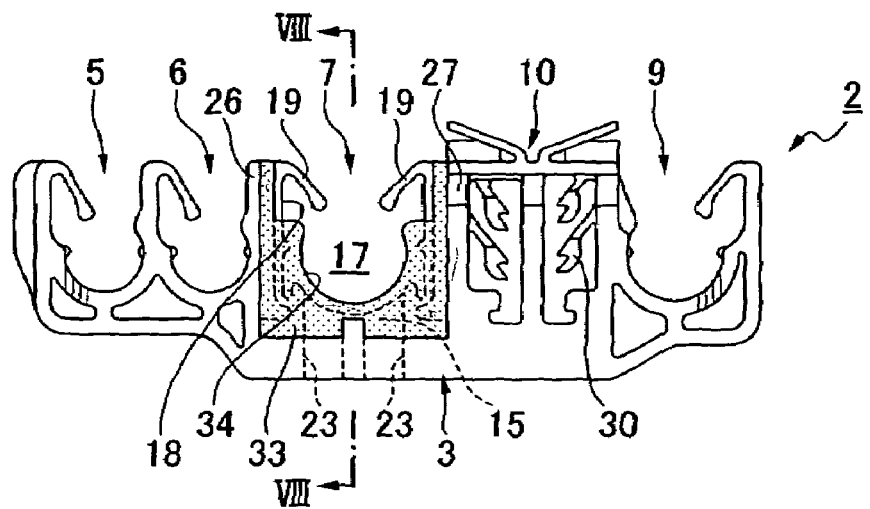
FIG. 6 is a front elevation view of the vibration suppressing clamp shown in FIG. 5.
Figure 7:
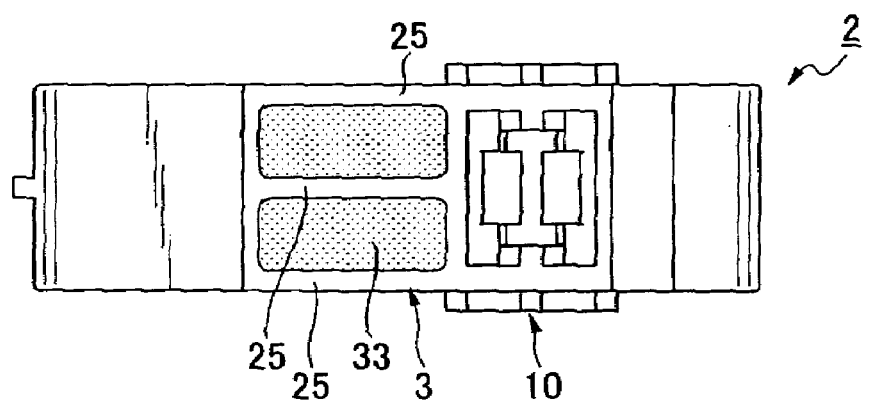
FIG. 7 is a bottom plan view of the vibration suppressing clamp shown in FIG. 5.
Figure 8:
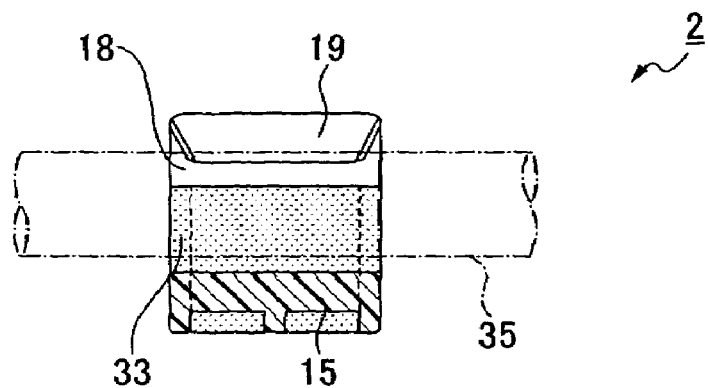
FIG. 8 is a sectional view, in the VIII—VIII plane, of the vibration suppressing clamp shown in FIG. 6.

In a preferred embodiment, although lower portions of the flexible walls 18 are enclosed by the vibration suppression member 33, the vibration suppression member 33 does not cover upper portions thereof, so the flexibility of the upper wall portions will not be impaired. The vibration suppression member 33 preferably fills the space between the flexible walls 18 and the rigid walls 26 and 27 and also surrounds the coupling pieces 29 shown in FIGS. 2 and 3. However, as shown in the modification of FIG. 6A, the vibration suppression member 33 may leave upper portions of the spaces between the flexible walls 18 and the rigid walls 26 and 27 open. Coupling pieces 29 function as anchors for the vibration suppression member 33, reinforcing the securing of the vibration suppression member bonded to the pipe holder 7, and peeling of the vibration suppression member is prevented.

The vibration suppression member 33, which encloses the first ribs 21 and second ribs 22, is strongly secured to the seat 15. Should the vibration suppression member 33 on the upper side of the seat 15 be compressed downward by shock toward a pipe, it will move downward as it is being deformed, into the through-holes 23, so that a place for the vibration suppression member 33 to retract is provided, and excessive deformation of the vibration suppression member 33 is prevented. Accordingly, failure of the vibration suppression member 33 can be prevented.

In the vibration suppressing clamp relating to the present invention, at least one vibration suppression member-equipped pipe holder 7 is provided. Although in this embodiment, there is but one vibration suppression member-equipped pipe holder 7, there may be a plurality thereof.

When a pipe is inserted into the pipe holder 7 covered by a vibration suppression member 33, the elastic holding pieces 19 first flex to the outside together with the upper portion of the flexible walls 18. Then, once the pipe is accommodated in the object accommodating space 17 and has been seated on the curved surface 34 of the vibration suppression member 33, the elastic holding pieces 19 return to their original position, press against the side surface of the pipe, and press the pipe into the vibration suppression member 33. Thus the pipe is held in the pipe holder 7. Pipes can also be inserted and held in the other pipe holders 5, 6, and 9.

Figure 9:
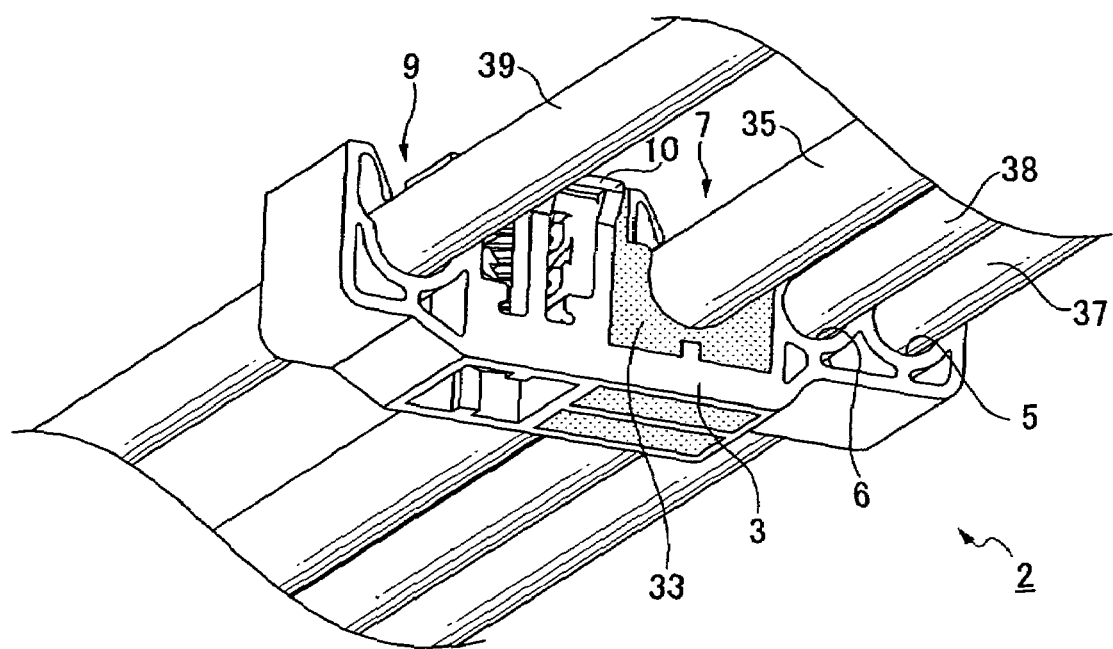
FIG. 9 is a perspective view showing a plurality of pipes supported by the vibration suppressing clamp shown in FIG. 5.

FIG. 9 shows the condition of the vibration suppressing clamp 2 with a pipe 35 held in the pipe holder 7, and pipes 37, 38, and 39 held in the other pipe holders 5, 6, and 9, respectively. In general, the pipes 35 and 37 to 39 may also be held by other vibration suppressing clamps 2 at other positions. In the vibration suppressing clamp 2, the pipe 35 held in the pipe holder 7 is held such that contact is made with the vibration suppression member 33 by a side surface on a lower portion thereof. On the upper side of the pipe 35, only the tips of the elastic holding pieces 19 are in contact therewith. As a consequence, almost none of the vibration of the pipe 35 is transmitted to the base 3, and, similarly, almost no vibration is transmitted from the base 3 to the pipe 35, so that enhanced vibration suppression can be realized.

The flexible walls 18 which support the elastic holding pieces 19, furthermore, are not directly coupled to the securing unit 10 or the pipe holder 6. The vibration suppression member 33 is present between the flexible walls 18 and the rigid walls 26 and 27 of the pipe holder 6 and the securing unit 10. As a consequence, the transmission of vibration from the elastic holding pieces 19 to the adjacent pipe holder 6 or securing unit 10 and the transmission of vibration from the pipe holder 6 and securing unit 10 to the elastic holding pieces 19 are prevented, and vibration suppression is realized. In the holding of the pipe 35, moreover, the curved bottom surface of the seat 15 functions as a rigidity-exhibiting core for the vibration suppression member 33, and strong holding forces are maintained.

Figure 10:
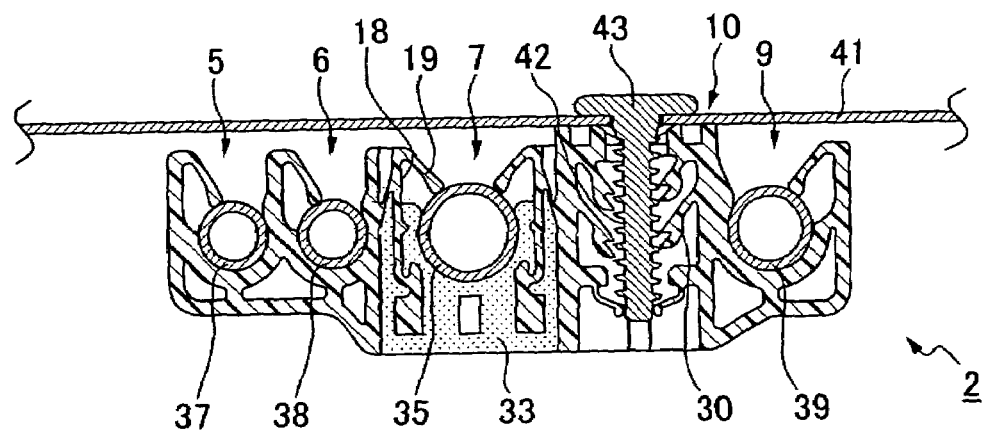
FIG. 10 is a sectional view of a vibration suppressing clamp shown in FIG. 9 secured to a vehicle body.

FIG. 10 shows how pipes 35 and 37 to 39 may be attached to a vehicle body 41 by the vibration suppressing clamp 2. To the vehicle body 41 is secured, by welding or the like, a stud 43 having a plurality of circumferential grooves 42, and the securing unit 10 is secured to the stud 43. The pipe 35 attached in this manner to the vehicle body 41 is sometimes subjected to shock forces when the vehicle is moving. Due to such shock, the pipe sometimes strongly compresses the vibration suppression member, causing the vibration suppression member to be deformed. In cases such as this, deformed portions of the vibration suppression member can retract into the through-holes 23 in the seat 15, and excessive deformation can be prevented.

While preferred embodiments of the invention have been shown and described it will be apparent that changes can be made without departing from the principles and spirit of the invention, the scope of which is defined in the following claims. For example, there may be some applications in which holes are not provided for retraction of the vibration suppression member in response to impact, and other applications in which the extent to which the vibration suppression member covers flexible walls and/or fills spaces between flexible walls and adjacent rigid walls varies.

What is claimed is:

1. A vibration suppressing clamp for holding an elongated object, comprising:
    a base; and
    an object holder supported by the base, wherein
    the object holder comprises a seat integral with the base, and a pair of walls that extend from side edges of the seat along a direction away from the base, to form a space for accommodating the object in cooperation with the seat, the seat has a hole or holes that extend from the seat and entirely through the base along an opposite direction, and the seat and portions of the walls adjacent to the seat are covered by a vibration suppression member.

2. A vibration suppressing clamp for holding an elongated object, comprising:
    a base; and
    an object holder supported by the base, wherein
    the object holder comprises a seat integral with the base, and a pair of walls that extend from side edges of the seat along a direction away from the base, to form a space for accommodating the object in cooperation with the seat, the seat has a hole or holes formed therein, and the seat and portions of the walls adjacent to the seat are covered by a vibration suppression member, wherein at least one of the walls is a flexible wall capable of flexing relative to the object accommodating space, and the flexible wall has on a tip portion thereof a holding piece, extending toward the object accommodating space, for pressing a side surface of the object accommodated in that space.

3. A vibration suppressing clamp for holding an elongated object, comprising:
    a base; and
    an object holder supported by the base, wherein
    the object holder comprises a seat integral with the base, and a pair of walls that extend from side edges of the seat, to form a space for accommodating the object in cooperation with the seat, the seat has a hole or holes formed therein, and the seat and portions of the walls adjacent to the seat are covered by a vibration suppression member, wherein at least one of the walls is a flexible wall capable of flexing relative to the object accommodating space, and the flexible wall has on a tip portion thereof a holding piece, extending toward the object accommodating space, for pressing a side surface of the object accommodated in that space, and wherein the seat has first ribs extending in the longitudinal direction of the object and second ribs crossing the first ribs, and the hole or holes are formed in a portion or portions of the seat where the first ribs and the second ribs are absent.

4. The vibration suppressing clamp recited in claim 3, wherein the base has third ribs which cross the first ribs in a portion continuous with the seat, and the hole or holes extend into a portion or portions of the base where the third ribs are absent.

5. A vibration suppressing clamp for holding an elongated object, comprising:
    a base; and
    an object holder supported by the base, wherein
    the object holder comprises a seat integral with the base, and a pair of walls that extend from side edges of the seat along a direction away from the base, to form a space for accommodating the object in cooperation with the seat, the seat has a hole or holes formed therein, and the seat and portions of the walls adjacent to the seat are covered by a vibration suppression member, wherein at least one of the walls is a flexible wall and the base has a rigid wall spaced from the flexible wall and connected with the flexible wall by a coupling piece, and the vibration suppression member occupies at least a portion of the space between the flexible wall and the rigid wall and embeds the coupling piece.

6. The vibration suppressing clamp recited in claim 5, wherein the base, the seat, and the walls are formed as a primary molding.

7. The vibration suppressing clamp recited in claim 1, wherein the seat is formed as a curved surface.

8. The vibration suppressing clamp recited in claim 1, wherein a securing unit is provided on the base for securing the clamp to a vehicle body.

9. A vibration suppressing clamp for holding an elongated object, comprising:
    a base; and
    an object holder supported by the base, wherein the object holder comprises a seat integral with the base, and a pair of walls that extend from side edges of the seat, to form a space for accommodating the object in cooperation with the seat, at least one of the walls is a flexible wall and the base has a rigid wall spaced from the flexible wall, the flexible wall is capable of flexing relative to the object accommodating space and relative to the space between the flexible wall and the rigid wall, the flexible wall has on a tip portion thereof a holding piece, extending toward the object accommodating space, for pressing a side surface of the object accommodated in that space, the seat and portions of the flexible wall adjacent to the seat are covered by a vibration suppression member, and a space between the flexible wall and the rigid wall is at least partially filled by the vibration suppression member.

10. The vibration suppressing clamp recited in claim 9, wherein the flexible wall is connected to the rigid wall by a coupling piece that is covered by the vibration suppression member.

* * * * *